United States Patent [19]

Kreiskorte

[11] Patent Number: 4,483,621

[45] Date of Patent: Nov. 20, 1984

[54] VIBRATION TABLE

[75] Inventor: Heinz Kreiskorte, Dortmund, Fed. Rep. of Germany

[73] Assignee: Thyssen Industrie Aktiengesellschaft, Essen, Fed. Rep. of Germany

[21] Appl. No.: 530,971

[22] Filed: Sep. 9, 1983

[30] Foreign Application Priority Data

Sep. 24, 1982 [DE] Fed. Rep. of Germany ....... 3235390

[51] Int. Cl.³ .............................................. B01F 11/00
[52] U.S. Cl. .................................... 366/111; 366/114; 366/240; 425/456
[58] Field of Search ............... 366/111, 112, 114, 197, 366/203, 204, 208, 209, 212, 218, 219, 240, 108, 110; 414/676; 198/752; 222/196, 200; 425/424, 456, 421

[56] References Cited

U.S. PATENT DOCUMENTS

| | | | |
|---|---|---|---|
| 991,381 | 5/1911 | Simmers | 366/111 |
| 1,193,190 | 8/1916 | Ripley | 366/212 |
| 1,947,398 | 2/1934 | Stuhler | 366/111 |
| 3,281,125 | 10/1966 | Shoe | 366/111 |
| 3,752,116 | 8/1973 | Kipple | 425/456 |

Primary Examiner—Robert W. Jenkins
Attorney, Agent, or Firm—Becker & Becker, Inc.

[57] ABSTRACT

A vibration table which essentially comprises a stationary base and a table top for receiving loads. The table top can be periodically moved back and forth, and is hydrostatically or pneumatically supported on the base. A plurality of pressure pockets, which are adapted to receive carrier medium, are disposed in a bearing surface of either the table top or the base. The table top is connected to the base by means of a spring system which includes a plurality of parallel and pivotably arranged coupling elements.

10 Claims, 8 Drawing Figures

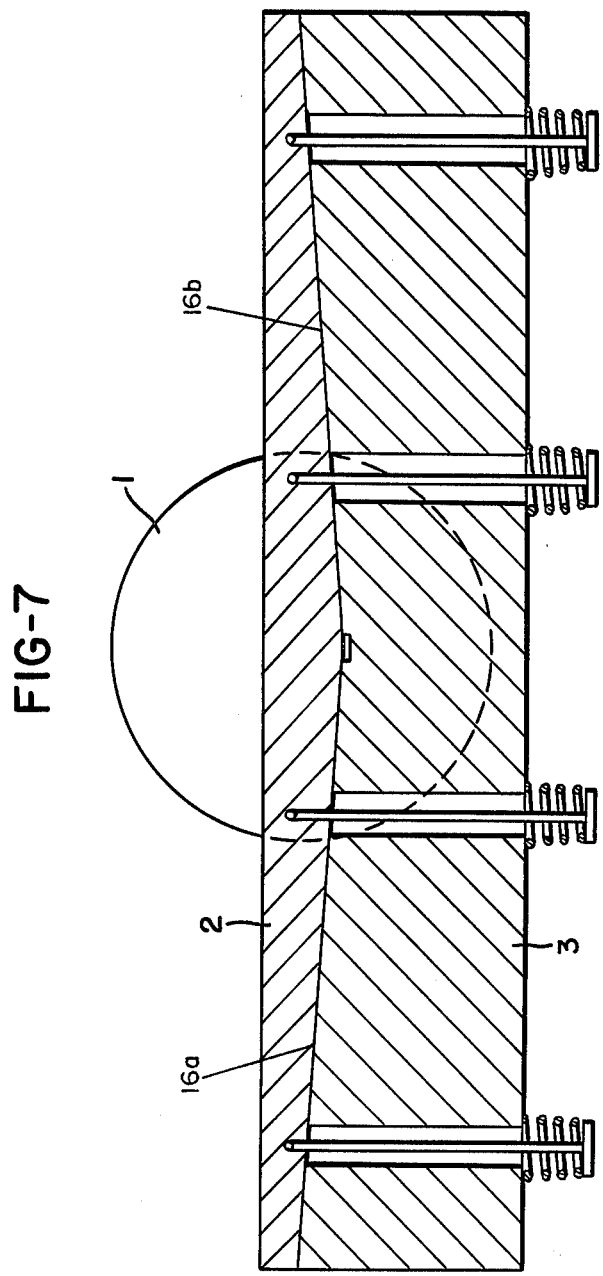

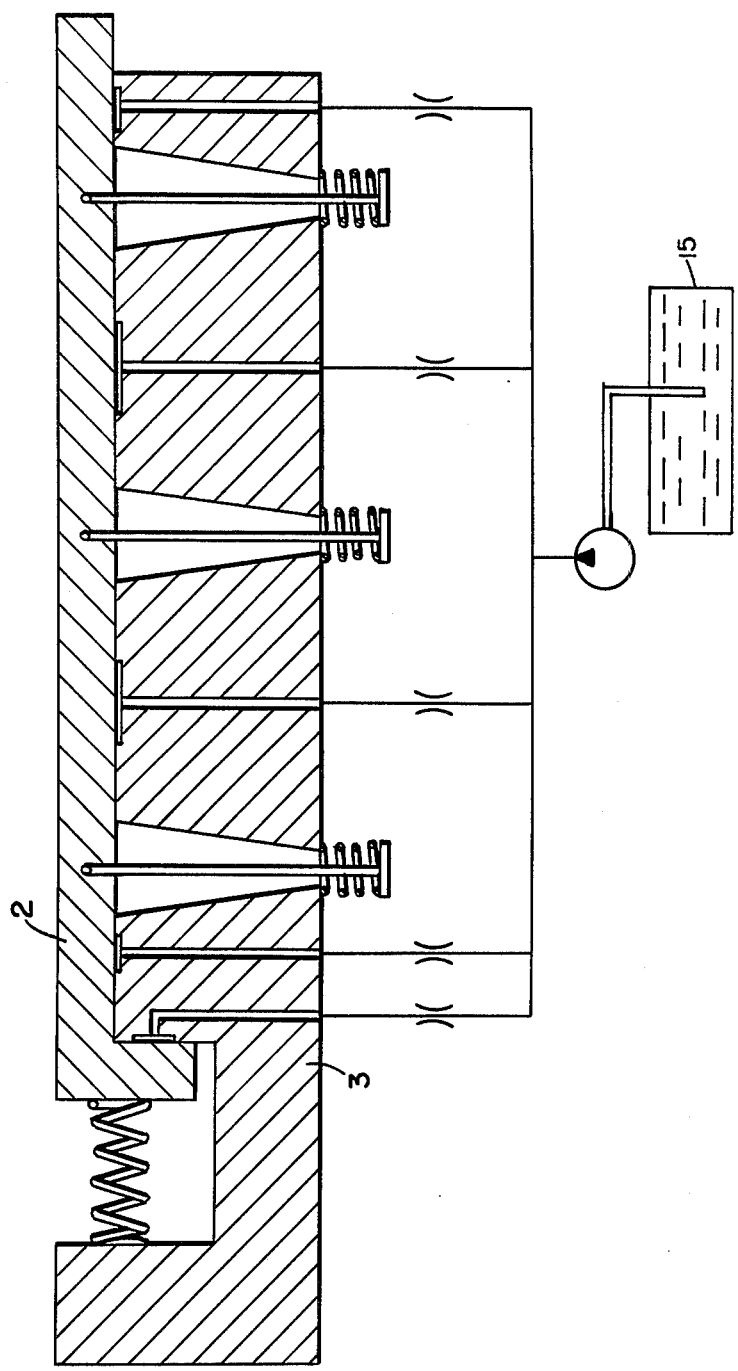

VIBRATION TABLE

BACKGROUND OF THE INVENTION

The present invention relates to a vibration or jarring table which essentially comprises a stationary base and a table top for absorbing loads which can be periodically moved back and forth and is hydrostatically or pneumatically supported on the base.

With such vibration tables, the table tops are operatively connected with vibration exciters or oscillators, and can, for example for workpieces which are to be tested, be linearly moved, with moments and possibly also transverse forces which occur thereby being absorbed by the table top. In this connection, it is customary to use hydrostatic or pneumatic supports which have a plurality of individual adjustable support positions, and upon which the table top can be supported in such a way as to be slidingly movable; alternatively, the table top can be allowed to float freely on a lubricating film located between the bearing surfaces.

Vibration tables of the aforementioned general type are disclosed in catalog 481 of Kimball Industries Incorporated, Monrovia, Calif. Hydrostatic supports disposed, for example, in the region of the corners of the table top serve to support the latter. With this arrangement of the supports at only a few points of the table top, the table top, with the test body located thereon, frequently executes tilting movements at right angles to the load direction as a result of the natural bending frequencies of the table top.

Simpler vibration tables are also known, according to which the table top is placed upon a plate which generally comprises granite. With these vibration tables, when tilting moments occur the table top is lifted from the base and executes uncontrollable wobbling movements. Therefore, table tops which rest upon granite are often additionally equipped with a plurality of hydrostatic supports.

The drawbacks to the heretofore known embodiments of vibration tables are the great expense, the limited ability to absorb moments and transverse forces, as well as the unfavorable tilting conditions and the large mass of the table top and supports.

It is an object of the present invention to provide a vibration table of the aforementioned general type which is distinguished by a simple construction which avoids the heretofore known drawbacks, and by a reliable operation.

BRIEF DESCRIPTION OF THE DRAWINGS

This object, and other objects and advantages of the present invention, will appear more clearly from the following specification in conjunction with the accompanying drawings, in which:

FIG. 7 is a cross section through a vibration table having two bearing surface sections which are disposed at an incline relative to one another; and FIG. 8 is a cross section through a vibration table, with the table top being provided with shoulders by means of which it is yieldingly braced relative to the base.

SUMMARY OF THE INVENTION

Figure 1:
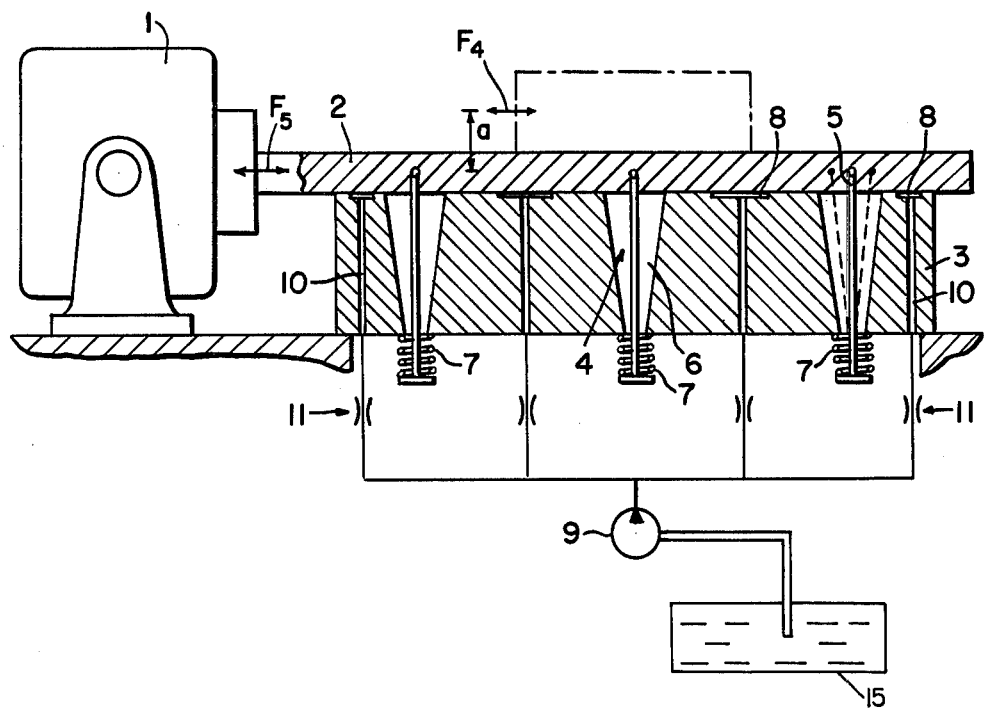
FIG. 1 is a partial schematic side view of one inventive embodiment of a vibration table, with the table top and base being illustrated in section, and a spring system which is provided with coupling elements and which connects the table top and base being illustrated in principle.

The vibration table of the present invention is characterized primarily in that a plurality of pressure pockets, which are adapted to receive carrier medium, are disposed in a bearing surface of either the table top or the base; and in that the table top is connected to the base by means of a yielding or spring system which includes a plurality of parallel and pivotably arranged coupling elements.

Due to the inventive construction, according to which nearly the entire surface area between the table top and the base is embodied as a hydrostatic or pneumatic support and the table top is pulled against the base by the spring system at a plurality of points, a dynamic equilibrium is achieved between the pushing and pulling forces on the table top, which is movable back and forth. At the same time, the pressure medium additionally effects a damping between the table top and the base, as a result of which the non-desired tilting is largely avoided.

Pursuant to advantageous further developments and preferred embodiments of the present invention, each coupling element may be a tie rod which is under prestress and which is passed through an aperture in the base. The tie rod may be braced by springs at either one or at both ends. The apertures for the tie rods, and the pressure pockets for the carrier medium, may be disposed in successive rows next to one another in the base.

All of the pressure pockets in the base may be connected by means of a conduit system having at least one pump and a common storage container for the carrier medium; furthermore, a flow control device may be present in each feed line to a pressure pocket. A pump may be associated with each of the pressure pockets.

The bearing surfaces of the table top and of the base may respectively comprise a single piece or a plurality of sections. In the event of a one-piece bearing surface, the latter may be planar. Alternatively, the bearing surfaces may be formed by at least two sections which are disposed in a V-shape relative to one another.

DESCRIPTION OF PREFERRED EMBODIMENTS

Referring now to the drawings in detail, the exemplary vibration or jarring table illustrated therein essentially comprises an electrodynamic exciter 1, a table top 2 which can be moved back and forth in the direction of the arrows, and a stationary base 3 disposed there below. The table top 2, which is movable relative to the base 3, is operatively connected with the base 3 by means of a yielding or spring system 4 which has a plurality of pivotably disposed coupling elements. Each of these coupling elements is a tie rod 5, one end of which is connected with the table top 2 in such a way as to be movable in all directions, and is passed through an aperture or hole 6 in the base 3; the other end of each tie rod 5 is braced relative to the base 3 by means of a spring, for example a coil spring 7. The table top 2 is pulled against the base 3 by means of the coupling elements or tie rods, which are prestressed. In its inoperative position, the table top 2 rests upon that bearing or support surface of the base 3 in which are located a plurality of pressure pockets 8 which are open toward the table top, and which are supplied with a carrier medium under pressure for and during the movement of the table top 2. Resting on the table top 2 is a test body which is to be subjected to a vibration test; this test body is indicated by a dot-dash line and is not shown in greater detail. By means of a pump 9, the carrier medium is supplied from a storage container 15, via a conduit system, to the pressure pockets 8 in the base 3; a flow control device 11 is disposed in each feed line 10 to the pressure pockets 8. When the pressure of this carrier medium in the pressure pockets 8 reaches a certain magnitude (which is dependent upon the spring preload of the coupling elements and the load of the table top 2 with the test body which is disposed thereupon), the table top 2 with the test body is lifted slightly from the bearing surface of the base 3 and a gap 12 (FIGS. 4 and 5) is produced in which a layer of the carrier medium is formed upon which the table top 2 floats. This small gap between the table top 2 and the base 3 is disposed in series with the flow control devices 11 and forms a pressure balance or manometer therewith, by means of which the pressure in the pressure pocket 8 is automatically adjusted in conformity to the load or the height of the gap.

Figure 2:
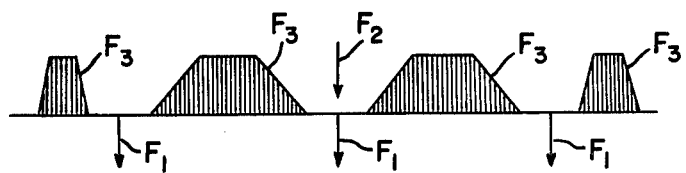
FIG. 2 is a force diagram.

The force and pressure relationships of the vibration table are shown in the force diagram of FIG. 2. In this instance, the spring forces $F_1$, and the forces $F_2$ which are produced by the weight of the table top 2 and the test body located thereupon, are in equilibrium with the forces $F_3$ which are produced by the pressure of the carrier medium.

Figure 3:
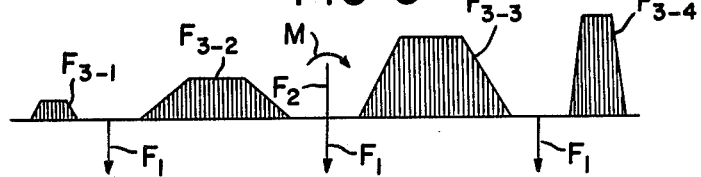
FIG. 3 is a force diagram.

If, due to the effect of the mass, horizontal forces $F_4$ occur during the vibration movement of the table top above the force introduction $F_5$, a pitching moment $M = F_4 \times a$ must be absorbed by the vibration table or the guides or supports of the table top. The forces, moments, and pressure conditions for such a load situation are illustrated in FIG. 3. Since each individual pressure pocket 8 is supplied with carrier medium via a flow control device 11, a pressure which corresponds to the load is also established in each pressure pocket. To compensate for the moment M, which turns in a clockwise direction, higher pressures $F_{3-3}$ and $F_{3-4}$ appear in those pressure pockets of the vibration table which are arranged toward the right in the drawing than do on the left portion of the vibration table, where the forces $F_{3-1}$ and $F_{3-2}$ appear. If the moment M is counterclockwise, the pressure conditions are reversed.

Figure 4:
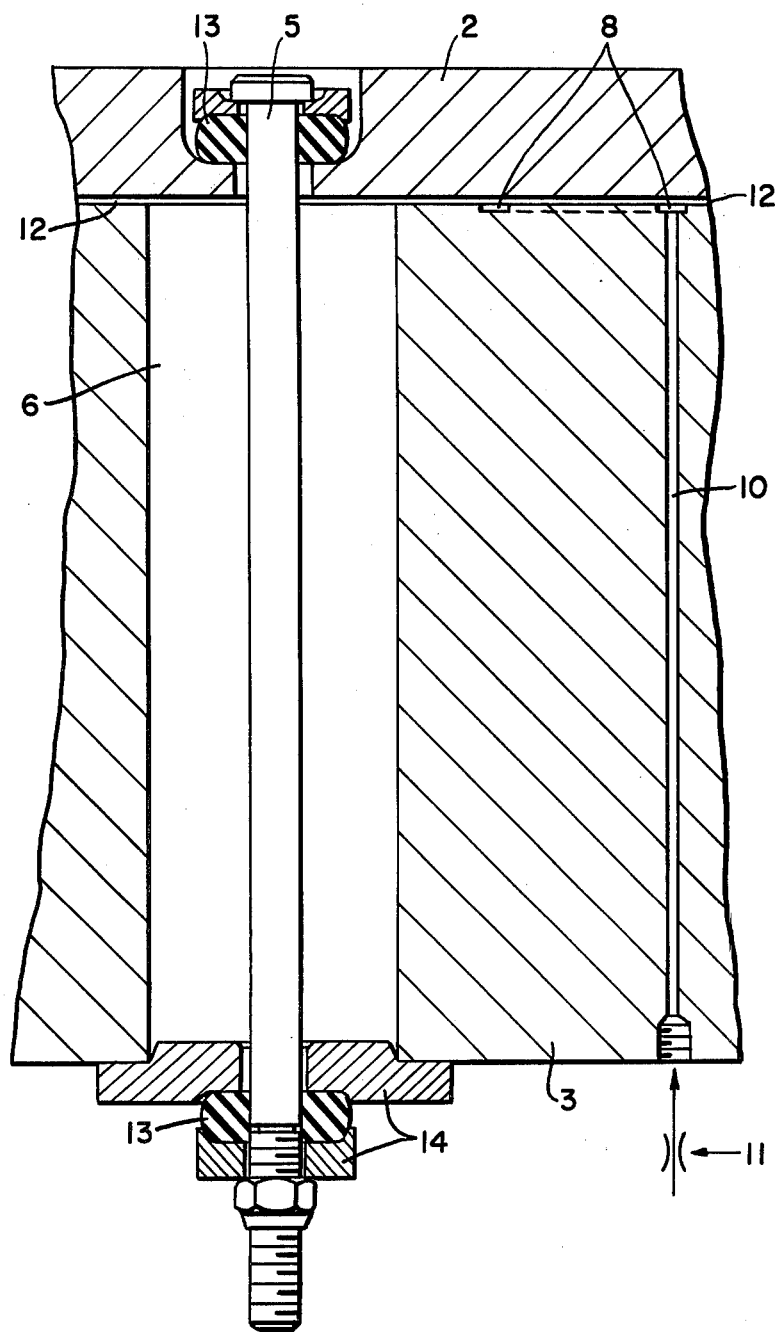
FIG. 4 is a detailed view of the vibration table to a larger scale showing a tie rod as a coupling element in the starting position.
Figure 5:
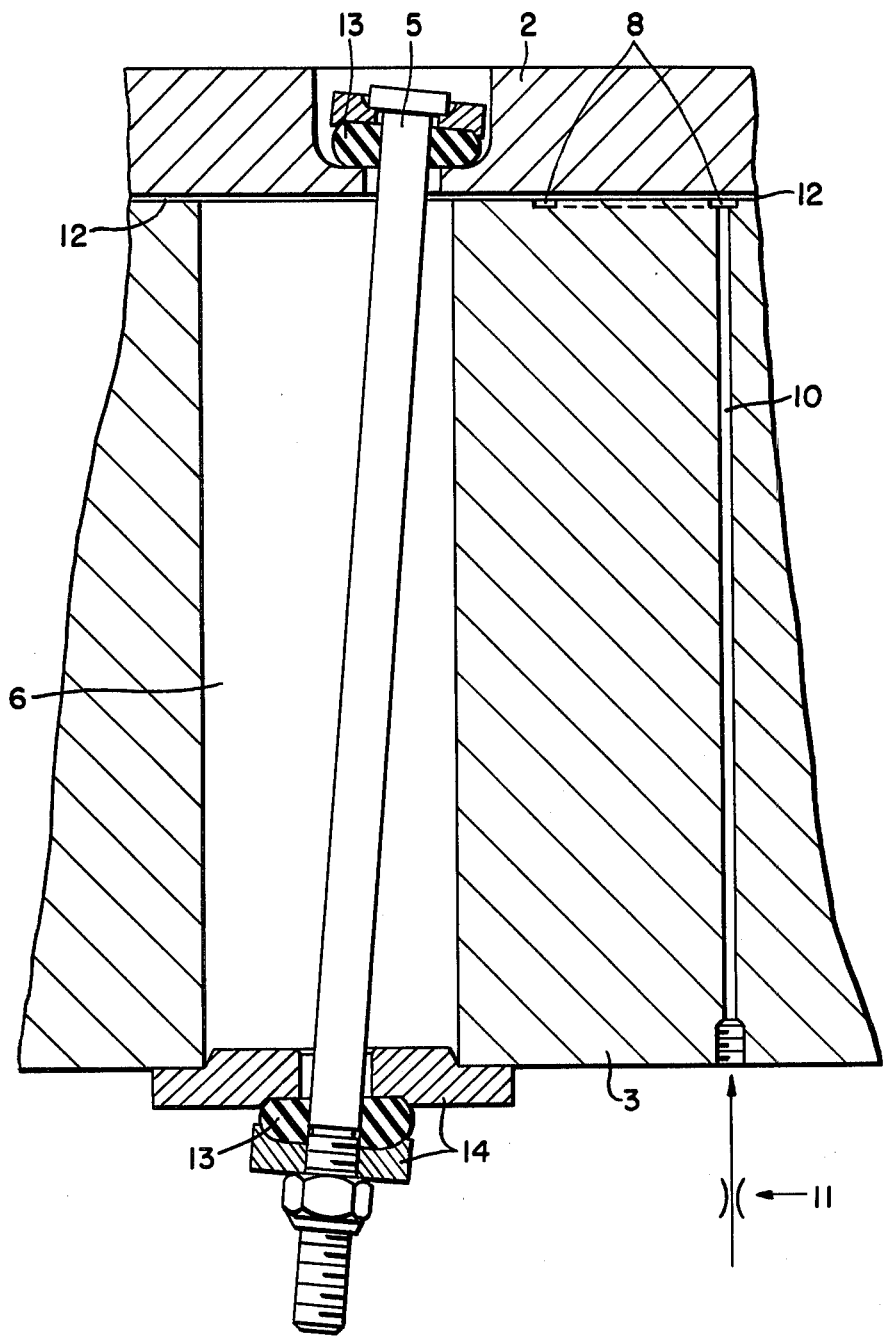
FIG. 5 is a view similar to that of FIG. 4 with the tie rod in an inclined position.

The tie rod 5 illustrated in FIGS. 4 and 5 is braced by springs 13 not only in the table top 2 but also relative to the base 3; in contrast to FIG. 1, the springs 13 are rubber springs. The rubber springs 13 associated with the base 3 are disposed between two metal discs 14, one of which at the same time serves for centering the tie rod section within the aperture 6 in the base 3. Furthermore, the pressure pocket 8 is illustrated as an annular groove.

When the table top 2 moves back and forth, the tie rod 5 carries out swinging movements, whereby above and below the rubber springs 13 are additionally compressed somewhat. In so doing, the initial stressing forces increase slightly. This increase of the initial stressing forces is compensated for by a slight increase in the pressure of the carrier medium in the pressure pockets. As a result of the increased initial stressing forces during the movements of the tie rod in both directions, and as a result of the horizontal force components, the table top 2 is repeatedly pulled back into its starting position. There thus results an adjustment effect.

It is to be understood that the aperture 6 in the base 3 must be large enough that the tie rod 5, which is tilted when it moves, does not make contact with the wall of the aperture.

Figure 6:
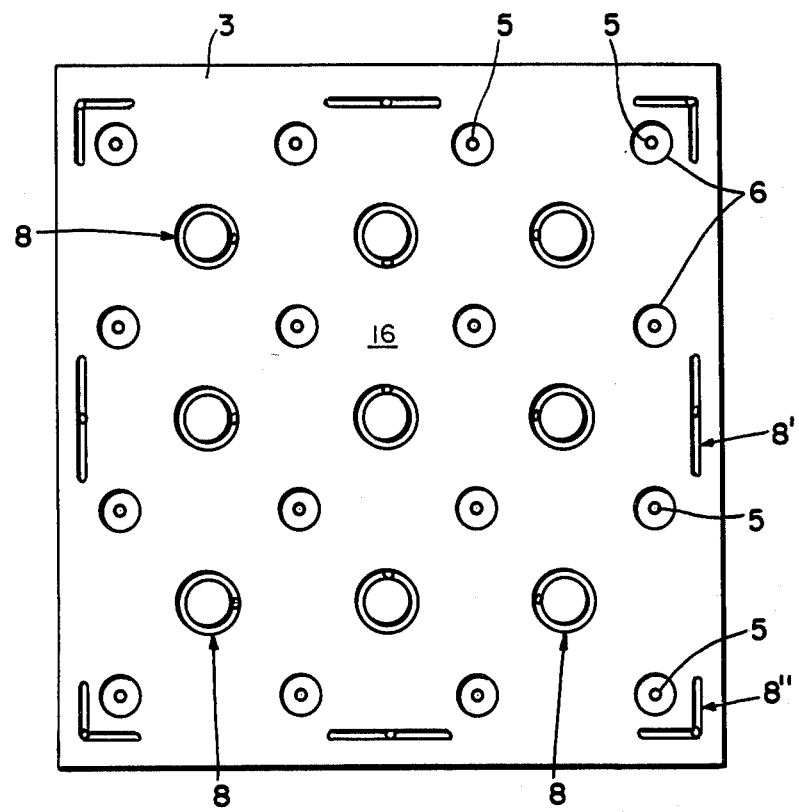
FIG. 6 is a plan view of the support or bearing surface of the base.

FIG. 6 shows the base 3, over the bearing surface 16 of which are uniformly distributed apertures 6 and the tie rods 5 which are located therein, as well as the pressure pockets 8 which are in the form of annular grooves. The aperture 6 and the pressure pockets 8 are disposed in rows which are consecutive, next to one another, as well as symmetrical. At the edge of this pressure plate are located additional pressure pockets 8' and 8'', which are respectively embodied as a longitudinal groove and an L-groove.

In order to stabilize the table top 2 relative to the base 3 in the transverse direction, or against movements about the vertical axis, the bearing surfaces of the table top 2 and the base 3 can have a V-shaped embodiment including bearing surface sections 16a and 16b (FIG. 7). However, it is just as possible, especially with planar bearing surfaces, to provide the table top 2 with shoulders, by means of which, through the interposition of springs, the table top 2 is braced relative to the base 3, as illustrated in FIG. 8.

The present invention is, of course, in no way restricted to the specific disclosure of the specification and drawings, but also encompasses any modifications within the scope of the appended claims.

What I claim is:

1. A vibration table, comprising:
   a stationary base having a first bearing surface;
   a table top for receiving loads, said table top being periodically movable back and forth, having a second bearing surface, and being supported on said base by fluid; a plurality of pressure pockets are disposed in one of said first and second bearing surfaces, said pressure pockets being adapted to receive carrier medium for effecting said fluid support of said table top on said base; and
   a spring system which connects said table top to said base, said spring system including a plurality of substantially parallel and pivotably arranged coupling elements.

2. A vibration table according to claim 1, in which said base is provided with a plurality of apertures, and in which each of said coupling elements is a tie rod which is under preload and is passed through one of said apertures of said base.

3. A vibration table according to claim 2, in which each of said tie rods has two ends, at least one of which is braced by means of a spring relative to an associated one of said table top and said base.

4. A vibration table according to claim 2, in which said pressure pockets for said carrier medium are disposed in said base; and in which said apertures in said base for said tie rods, and said pressure pockets, are respectively disposed in successive rows next to one another.

5. A vibration table according to claim 4, which includes: a conduit system, including a feed line for each pressure pocket; a flow control device provided in each of said feed lines; at least one pump associated with said conduit system; and a storage container, for said carrier medium, associated with said conduit system, all of said pressure pockets being connected with one another via said conduit system.

6. A vibration table according to claim 1, in which a pump is associated with each of said pressure pockets.

7. A vibration table according to claim 1, in which said first and second bearing surfaces of said base and said table top respectively comprise a single piece.

8. A vibration table according to claim 7, in which said first and second bearing surfaces are planar.

9. A vibration table according to claim 1, in which said first and second bearing surfaces of said base and said table top respectively comprise more than a single piece.

10. A vibration table according to claim 9, in which said first and second bearing surfaces are respectively formed of at least two sections disposed in a V-shape relative to one another.

* * * * *